(12) United States Patent
Misra et al.

(10) Patent No.: US 8,768,079 B2
(45) Date of Patent: Jul. 1, 2014

(54) TRACKING A REFERENCE PICTURE ON AN ELECTRONIC DEVICE

(75) Inventors: Kiran Misra, Vancouver, WA (US); Sachin G. Deshpande, Camas, WA (US); Christopher A. Segall, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 77 days.

(21) Appl. No.: 13/273,191

(22) Filed: Oct. 13, 2011

(65) Prior Publication Data

US 2013/0094585 A1    Apr. 18, 2013

(51) Int. Cl.
*G06K 9/36* (2006.01)
*G06K 9/46* (2006.01)
*H04N 11/02* (2006.01)
*H04N 7/26* (2006.01)
*H04N 7/36* (2006.01)

(52) U.S. Cl.
CPC ... *H04N 19/00884* (2013.01); *H04N 19/00727* (2013.01); *H04N 19/0484* (2013.01)
USPC .................. 382/233; 382/232; 375/240.12

(58) Field of Classification Search
USPC ................. 382/232–253; 375/240.01–240.25
See application file for complete search history.

(56) References Cited

U.S. PATENT DOCUMENTS

| 7,403,660 | B2 * | 7/2008 | Hannuksela | 382/232 |
|---|---|---|---|---|
| 7,724,818 | B2 * | 5/2010 | Hannuksela et al. | 375/240.01 |
| 7,782,946 | B2 * | 8/2010 | Jeon et al. | 375/240.12 |
| 7,817,865 | B2 * | 10/2010 | Yang | 382/233 |
| 8,165,216 | B2 * | 4/2012 | Chen et al. | 375/240.24 |
| 2005/0180512 | A1 * | 8/2005 | Narasimhan et al. | 375/240.28 |
| 2006/0013318 | A1 * | 1/2006 | Webb et al. | 375/240.25 |
| 2007/0274679 | A1 * | 11/2007 | Yahata et al. | 386/69 |
| 2009/0147850 | A1 * | 6/2009 | Pandit | 375/240.15 |
| 2010/0034254 | A1 * | 2/2010 | Wang | 375/240.01 |
| 2010/0111173 | A1 * | 5/2010 | Koo et al. | 375/240.12 |
| 2010/0189182 | A1 * | 7/2010 | Hannuksela | 375/240.25 |
| 2010/0238822 | A1 * | 9/2010 | Koyabu et al. | 370/252 |
| 2011/0019747 | A1 * | 1/2011 | Hannuksela et al. | 375/240.25 |
| 2013/0058408 | A1 | 3/2013 | Wahadaniah et al. | |
| 2013/0077681 | A1 * | 3/2013 | Chen et al. | 375/240.12 |
| 2013/0077687 | A1 * | 3/2013 | Wang et al. | 375/240.15 |
| 2013/0215975 | A1 * | 8/2013 | Samuelsson et al. | 375/240.25 |

FOREIGN PATENT DOCUMENTS

| EP | 2104361 A1 * | 9/2009 | H04N 7/64 |
|---|---|---|---|
| WO | 2013/035313 | 3/2013 | |

OTHER PUBLICATIONS

"Advanced video coding for generic audiovisual services," Int. Telecommun. Union-Telecommun. (ITU-T) and Int. Standards Org./ Int. Electrotech. Comm. (ISO/IEC) JTC 1, Recommendation H.264 and ISO/IEC 14496-10 (MPEG-4) AVC, 2003.

(Continued)

*Primary Examiner* — Li Liu
(74) *Attorney, Agent, or Firm* — Austin Rapp & Hardman

(57) ABSTRACT

A method for tracking a reference picture on an electronic device is described. The method includes receiving a bitstream. The method also includes decoding a portion of the bitstream to produce a decoded reference picture. The method further includes tracking the decoded reference picture in a decoded picture buffer (DPB) with reduced overhead referencing. The method additionally includes decoding a picture based on the decoded reference picture.

26 Claims, 10 Drawing Sheets

(56) References Cited

OTHER PUBLICATIONS

JCTVC-F803_d2, "WD4: Working Draft 4 of High-Efficiency Video Coding," Benjamin Bross, Woo-Jin Han, Jens-Rainer Ohm, Gary J. Sullivan, Thomas Wiegand, Joint Collaborative Team on Video Coding (JCT-VC) of ITU-T SG16 WP3 and ISO/IEC JTC1/SC29/WG11 6th Meeting: Torino, IT, Jul. 14-22, 2011, available at http://phenix.it-sudparis.eu/jct/doc_end_user/documents/6_Torino/wg11/JCTVC-F803-v4.zip.

JCTVC-F803_d1, "WD4: Working Draft 4 of High-Efficiency Video Coding" (a.k.a. Buffer Discriptions r0) Benjamin Bross, Woo-Jin Han, Jens-Rainer Ohm, Gary J. Sullivan, Thomas Wiegand, Joint Collaborative Team on Video Coding (JCT-VC) of ITU-T SG16 WP3 and ISO/IEC JTC1/SC29/WG11 6th Meeting: Torino, IT, Jul. 14-22, 2011, available at ftp://ftp.hhi.de/ahg21/JCTVC-F803_d1_Buffer Descriptions_r0.doc.

JCTVC-F803_d1, "WD4: Working Draft 4 of High-Efficiency Video Coding" (a.k.a. Buffer Descriptions Display Process Suggestion), Benjamin Bross, Woo-Jin Han, Jens-Rainer Ohm, Gary J. Sullivan, Thomas Wiegand, Joint Collaborative Team on Video Coding (JCT-VC) of ITU-T SG16 WP3 and ISO/IEC JTC1/SC29/WG11 6th Meeting: Torino, IT, Jul. 14-22, 2011, available at ftp://ftp.hhi.de/ahg21/JCTVC-F803_d1_Buffer_Descriptions_display_process_suggestion.doc.

JCTVC-F493, "Absolute signaling of reference pictures," Rickard Sjöberg, Jonatan Samuelsson, Joint Collaborative Team on Video Coding (JCT-VC) of ITU-T SG16 WP3 and ISO/IEC JTC1/SC29/WG11 6th Meeting: Torino, IT, Jul. 14-22, 2011, available at http://phenix.int-evry.fr/jct/doc_end_user/documents/6_Torino/wg11/JCTVC-F493-v8.zip.

Misra, K., Deshpande, S., and Segall, A., "Long Term Picture Referencing Using Wrapped POC," Joint Collaborative Team on Video Coding (JCT-VC) of ITU-T SG16 WP3 and ISO/IEC JTC1/SC29/WG11 7th Meeting JCTVC-G713, Nov. 2011.

International Search Report issued for International Application No. PCT/JP2012/077021 on Dec. 18, 2012.

International Search Report issued for International Patent Application No. PCT/JP2013/002505 on Jul. 9, 2013.

JCTVC-G715, "AHG18/21: Absolute signaling for resolution switching," Kiran Misra, Sachin Deshpande, Louis Kerofsky, Andrew Segall, Joint Collaborative Team on Video Coding (JCT-VC) of ITU-T SG16 WP3 and ISO/IEC JTC1/SC29/WG11 7th Meeting: Geneva, CH, Nov. 21-30, 2011.

JCTVC-H0468, "AHG21: Flexible signalling of long term reference pictures," Viktor Whadaniah, ChongSoon Lim, Joint Collaborative Team on Video Coding (JCT-VC) of ITU-T SG16 WP3 and ISO/IEC JTC1/SC29/WG11 8th Meeting: San Jose, CA, USA, Feb. 1-10, 2012.

JCTVC-H0502, "Signaling of long-term reference pictures in the PPS," Ye-Kui Wang, Ying Chen, Joint Collaborative Team on Video Coding (JCT-VC) of ITU-T SG16 WP3 and ISO/IEC JTC1/SC29/WG11 8th Meeting: San Jose, CA, USA, Feb. 1-10, 2012.

JCTVC-J0116r1, "AHG13: Signalling of long-term reference pictures in the SPS," Adarsh K. Ramasubramonian, Ye-Kui Wang, Ying Chen, Joint Collaborative Team on Video Coding (JCT-VC) of ITU-T SG16 WP3 and ISO/IEC JTC1/SC29/WG11 10th Meeting: Stockhom, SE, Jul. 11-20, 2012.

* cited by examiner

US 8,768,079 B2

TRACKING A REFERENCE PICTURE ON AN ELECTRONIC DEVICE

TECHNICAL FIELD

The present disclosure relates generally to electronic devices. More specifically, the present disclosure relates to enabling tracking of a reference picture.

BACKGROUND

Electronic devices have become smaller and more powerful in order to meet consumer needs and to improve portability and convenience. Consumers have become dependent upon electronic devices and have come to expect increased functionality. Some examples of electronic devices include desktop computers, laptop computers, cellular phones, smart phones, media players, integrated circuits, etc.

Some electronic devices are used for processing and displaying digital media. For example, portable electronic devices now allow for digital media to be consumed at almost any location where a consumer may be. Furthermore, some electronic devices may provide download or streaming of digital media content for the use and enjoyment of a consumer.

The increasing popularity of digital media has presented several problems. For example, efficiently representing high-quality digital media for storage, transmittal and playback presents several challenges. As can be observed from this discussion, systems and methods that represent digital media more efficiently may be beneficial.

DETAILED DESCRIPTION

Figure 1:
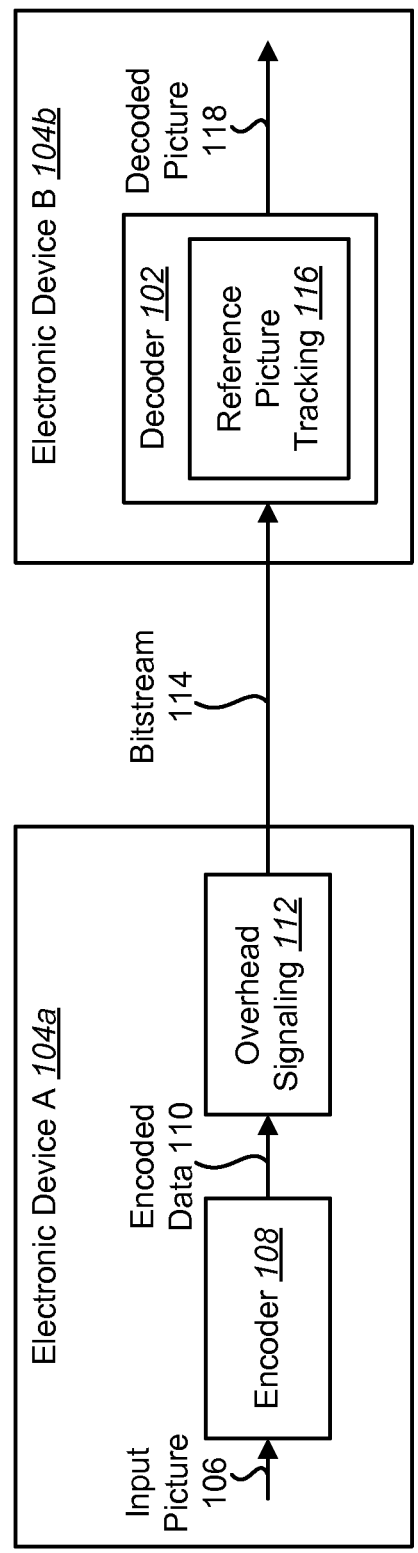
FIG. 1 is a block diagram illustrating an example of one or more electronic devices in which systems and methods for tracking a reference picture may be implemented.

A method for tracking a reference picture on an electronic device is described. The method includes receiving a bitstream. The method also includes decoding a portion of the bitstream to produce a decoded reference picture. The method further includes tracking the decoded reference picture in a decoded picture buffer (DPB) with reduced overhead referencing. The method additionally includes decoding a picture based on the decoded reference picture. A cycle parameter may be represented by a signed integer or an unsigned integer. Decoding the picture may be based on one or more decoded reference pictures.

Tracking the decoded reference picture may include associating a cycle parameter with a decoded picture set that includes the decoded reference picture. Tracking the decoded reference picture may also include determining whether a wrap indicator is received. Tracking the decoded reference picture may further include modifying the cycle parameter if a wrap indicator is received.

Tracking the decoded reference picture may include associating a cycle parameter with a decoded picture set that includes the decoded reference picture. Tracking the decoded reference picture may also include determining whether a transition has occurred between picture sets. Tracking the decoded reference picture may further include modifying the cycle parameter if the transition has occurred.

Determining whether a transition has occurred between picture sets may include determining whether a first picture order count (POC) of a current picture being decoded is less than a second POC of a last decoded picture and whether the second POC minus the first POC is greater than a first threshold. Determining whether a transition has occurred may also include determining that a transition from an earlier picture set has occurred if the first POC is less than the second POC and if the second POC minus the first POC is greater than the first threshold. Determining whether a transition has occurred may additionally include determining whether the first POC is greater than the second POC and whether the first POC minus the second POC is greater than a second threshold. Determining whether a transition has occurred may also include determining that a transition from a later picture set has occurred if the first POC is greater than the second POC and if the first POC minus the second POC is greater than the second threshold. Determining whether a transition has occurred may further include determining that no transition has occurred otherwise.

A buffer description of the decoded reference picture may include a picture order count (POC), a cycle parameter and a temporal identifier. A buffer description of the decoded reference picture may include a slot index that points to a location in the DPB. A buffer description of the decoded reference picture may include a function of a picture order count (POC) and a cycle parameter as well as a temporal identifier.

An adaptive slice parameter set or adaptation parameter set (APS) may include a number of reference pictures, a picture order count, a picture order count cycle parameter, a temporal identifier picture order count parameter, a picture parameter set number of reference pictures, a picture parameter set picture order count, a picture parameter set picture order count cycle parameter and/or a picture parameter set temporal identifier picture order count parameter. A received slice header may include a number of reference pictures, a picture order count, a picture order count cycle parameter, a temporal identifier picture order count parameter, a picture parameter set number of reference pictures, a picture parameter set picture order count, a picture parameter set picture order count cycle parameter and/or a picture parameter set temporal identifier picture order count parameter separately from buffer description information.

Tracking the decoded reference picture may be based on an information subindex and a picture order count parameter or a picture parameter set (PPS) picture order count parameter. A subset of received pictures may be referenced using delta referencing and a subset of received pictures may be referenced using absolute referencing.

An electronic device configured for tracking a reference picture is also described. The electronic device includes a processor and instructions stored in memory that is in electronic communication with the processor. The electronic device receives a bitstream. The electronic device also decodes a portion of the bitstream to produce a decoded reference picture. The electronic device further tracks the decoded reference picture in a decoded picture buffer (DPB) with reduced overhead referencing. The electronic device additionally decodes a picture based on the decoded reference picture.

The systems and methods disclosed herein describe several configurations for tracking a reference picture on an electronic device. For example, the systems and methods disclosed herein describe tracking a decoded reference picture in a decoded picture buffer (DPB) with reduced overhead referencing. For instance, several approaches for long term reference picture signaling are described. It should be noted that the decoded picture buffer (DPB) may be a buffer holding decoded pictures for reference, output reordering, or output delay specified for a hypothetical reference decoder.

On an electronic device, a decoded picture buffer (DPB) may be used to store reconstructed (e.g., decoded) pictures at a decoder. These stored pictures may then be used, for example, in an inter-prediction mechanism. When pictures are decoded out of order, the pictures may be stored in the DPB so they can be displayed later in order.

In the H.264 or advance video coding (AVC) standard, DPB management (e.g., deletion, addition of pictures, reordering of pictures, etc.) is carried out using memory management control operations (MMCO). For the upcoming high efficiency video coding (HEVC) standard, more reliable DPB management approaches are under consideration. One example of a more reliable approach is based on absolute signaling of reference pictures as detailed in "Absolute signaling of reference pictures" from the Joint Collaborative Team on Video Coding (JCT-VC) document JCTVC-F493.

JCTVC-F493 outlines absolute signaling of reference pictures to identify which reference pictures should be kept in the decoded picture buffer (DPB). In particular, it outlines two different approaches to identify which reference pictures are to be kept in the DPB based on a picture order count (POC). The picture order count (POC) may be a variable that is associated with each encoded picture and has a value that is increasing with increasing picture position in an output order with wrap-around.

In one example, assume that all pictures have a temporal identifier (temporalID)=0. Further assume that the current POC=5 and that the current DPB contains={3, 2}. Additionally assume that a definition in the Picture Parameter Set (PPS) is: BufferDescription°={deltaPOC=−1, temporalID=0}, {deltaPOC=−2, temporalID=0}. One approach given is to reference a buffer description in the PPS. In this approach, the slice header of a picture with POC=5 contains a reference to BufferDescription0 in the PPS. Assume that an action is to drop a decoded picture with POC=2 from the DPB and to add a decoded picture with POC=4 to the DPB. As a result, the DPB then contains={4, 3}.

It should be noted that a temporalID may be defined as follows in the Joint Collaborative Team on Video Coding (JCT-VC) document JCTVC-F803: "temporalID specifies a temporal identifier for the NAL unit. The value of temporalID shall be the same for all NAL units of an access unit. When an access unit contains any NAL unit with the nal_unit_type equal to 5, temporalID shall be equal to 0." It should be noted that NAL may be an abbreviation for "network abstraction layer."

Another approach is to explicitly signal the contents of the DPB using a delta POC with respect to the current POC. In this approach, the slice header of a picture with POC=5 contains {deltaPOC=−1, temporalID=0} and {deltaPOC=−2, temporalID=0}. Assume that an action is to drop a decoded picture with POC=2 from the DPB and to add a decoded picture POC=4 to the DPB. As a result, the new DPB contains={4, 3}.

Some advantages of the approaches given by JCTVC-F493 are as follows. The approaches in JCTVC-F493 provide a simple mechanism. Furthermore, a loss of a picture is easily detected at the decoder. Additionally, dropping of entire layers of pictures with a higher temporal ID may be detected and well supported.

However, some disadvantages of the approaches given in JCTVC-F493 are given hereafter. The bit overhead for signaling a long-term reference picture can become large. Furthermore, a fixed number of bits may be allocated to communicate a POC. As a result, when a maximum value allowed by the number of bits being used is reached, the POC numbering should wrap around to 0. Thus, it may not be possible to guarantee that pictures can be uniquely identified using the POC.

The systems and methods disclosed herein may help to mitigate these disadvantages. In particular, the systems and methods disclosed herein may be beneficial by reducing the overhead associated with absolute long term picture referencing and may enable pictures to be uniquely identified (e.g., a long-term (reference) picture may not be confused with other short-term or long-term pictures and vice-versa).

The systems and methods disclosed herein may provide one or more additional benefits that are described as follows. One or more configurations of the systems and methods disclosed herein may make full use of the available POC numbering space [0, . . . , MaxPOC−1], where MaxPOC= $2^{log2\_max\_pic\_order\_cnt\_minus4+4}$ and log 2_max_pic_order_cnt_minus4 specifies the value of the variable MaxPOC that is used in the decoding process for picture order count. For example, one prior approach to resolving re-use of [0, . . . , MaxPOC−1] after a POC wrap-around advocates that the POC currently in use are stepped over when assigning an identifier (e.g., a POC number) to a picture. This results in part of the POC space not being used. However, the systems and methods disclosed herein may resolve the stepping over of POC and the associated POC space shrinkage issue.

Another benefit may be that some configurations of the systems and methods disclosed herein for signaling may be self-contained in each picture. Thus, error resilience may be better compared to a scheme that relies on information propagation from previous pictures (that could get lost or dropped). For example, one configuration of the decoded picture buffer (DPB) description does not rely on information embedded in other pictures to maintain the same DPB as an encoder.

Yet another benefit of some configurations of the systems and methods disclosed herein may be that if a picture is lost, the loss can be detected as soon as a buffer description is available at the decoder (which is at the next received picture). This allows the decoder to take corrective action. Yet another benefit is that if the POC resolution is sufficient, no extra bits are required.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating an example of one or more electronic devices 104 in which systems and methods for tracking a reference picture may be implemented. In this example, electronic device A 104a and electronic device B 104b are illustrated. However, it should be noted that the features and/or functionality described in relation to electronic device A 104a and electronic device B 104 may be combined into a single electronic device in some configurations.

Electronic device A 104a includes an encoder 108 and an overhead signaling module 112. Each of the elements included within electronic device A 104a (e.g., the encoder 108 and the overhead signaling module 112) may be implemented in hardware, software or a combination of both.

Electronic device A 104a may obtain an input picture 106. In some configurations, the input picture 106 may be captured on electronic device A 104a using an image sensor, retrieved from memory and/or received from another electronic device.

The encoder 108 may encode the input picture 106 to produce encoded data 110. For example, the encoder 108 may encode a series of input pictures 106 (e.g., video). In one configuration, the encoder 108 may be a high-efficiency video coding (HEVC) encoder. The encoded data 110 may be digital data (e.g., a bitstream).

The overhead signaling module 112 may generate overhead signaling based on the encoded data 110. For example, the overhead signaling module 112 may add overhead data to the encoded data 110 such as slice header information, picture parameter set (PPS) information, picture order count (POC), reference picture designation, etc. In some configurations, the overhead signaling module 112 may produce a wrap indicator that indicates a transition between two sets of pictures.

More detail on kinds of overhead signaling that may be produced by electronic device A 104a is given below. In particular, none, one or more of the parameters, indicators or kinds of information described in relation to decoding below may be produced by the overhead signaling module 112, depending on the configuration. It should be noted that the overhead signaling module 112 may be included within the encoder 108 in some configurations. The overhead signaling module 112 may enable picture tracking with reduced overhead referencing.

The encoder 108 (and overhead signaling module 112, for example) may produce a bitstream 114. The bitstream 114 may include encoded picture data based on the input picture 106. In some configurations, the bitstream 114 may also include overhead data, such as slice header information, PPS information, etc. More detail on overhead data is given below. As additional input pictures 106 are encoded, the bitstream 114 may include one or more encoded pictures. For instance, the bitstream 114 may include one or more encoded reference pictures and/or other pictures.

The bitstream 114 may be provided to a decoder 102. In one example, the bitstream 114 may be transmitted to electronic device B 104b using a wired or wireless link. In some cases, this may be done over a network, such as the Internet or a Local Area Network (LAN). As illustrated in FIG. 1, the decoder 102 may be implemented on electronic device B 104b separately from the encoder 108 on electronic device A 104a. However, it should be noted that the encoder 108 and decoder 102 may be implemented on the same electronic device in some configurations. In an implementation where the encoder 108 and decoder 102 are implemented on the same electronic device, for instance, the bitstream 114 may be provided over a bus to the decoder 102 or stored in memory for retrieval by the decoder 102.

The decoder 102 may be implemented in hardware, software or a combination of both. In one configuration, the decoder 102 may be a high-efficiency video coding (HEVC) decoder. The decoder 102 may receive (e.g., obtain) the bitstream 114. The decoder 102 may generate a decoded picture 118 (e.g., one or more decoded pictures 118) based on the bitstream 114. The decoded picture 118 may be displayed, played back, stored in memory and/or transmitted to another device, etc.

The decoder 102 may include a reference picture tracking module 116. The reference picture tracking module 116 may enable the decoder 102 to track a reference picture with reduced overhead referencing. For example, the reference picture tracking module 116 may track a reference picture in a decoded picture buffer (DPB) using less overhead than is needed with prior approaches, such as approaches given in JCTVC-F493.

In prior approaches, for example, non-reduced overhead referencing may be used to specify the relationship between a current picture and a long term reference picture. In prior approaches, for instance, the relationship between a current picture and a long term reference picture may be specified by increasing the POC numbering space and thereby avoiding the POC wraparound issue. However, increasing the POC numbering space can only be achieved at the expense of an increased bit-requirement for POC. This example is one of several possible mechanisms that can be used to avoid the POC wrap around issue in prior approaches. However, this particular example demonstrates the larger overhead aspect for long-term pictures in prior approaches.

JCTVC-F493, for example, used a longterm_poc[i] field in a buffer description that specified an absolute POC and a longterm_temporal_id[i] field in the buffer description that specified a temporal ID for a long term picture. This was later removed in JCTVC-F803, which did not include a mechanism for long term pictures. In subsequent discussions, an approach of stepping over (long term picture) POCs was given.

Problems may arise with the prior approaches. First, a large amount of overhead data may be needed to specify the relationship between a long term reference picture and another picture. For instance, a large number of overhead bits may need to be allocated to adequately represent an integer number difference in POC between the long term reference picture and another picture. Second, if a limited number of bits is specified to represent this difference, the difference may be ambiguously indicated when numbers are reused (because of number set cycling, for example).

The reference picture tracking module 116 may use one or more approaches or methods that are described in greater detail below in order to reduce referencing overhead. Some examples include using a cycle parameter and decrementing the cycle parameter based on wrap indicators or transitions between sets of pictures.

Figure 2:
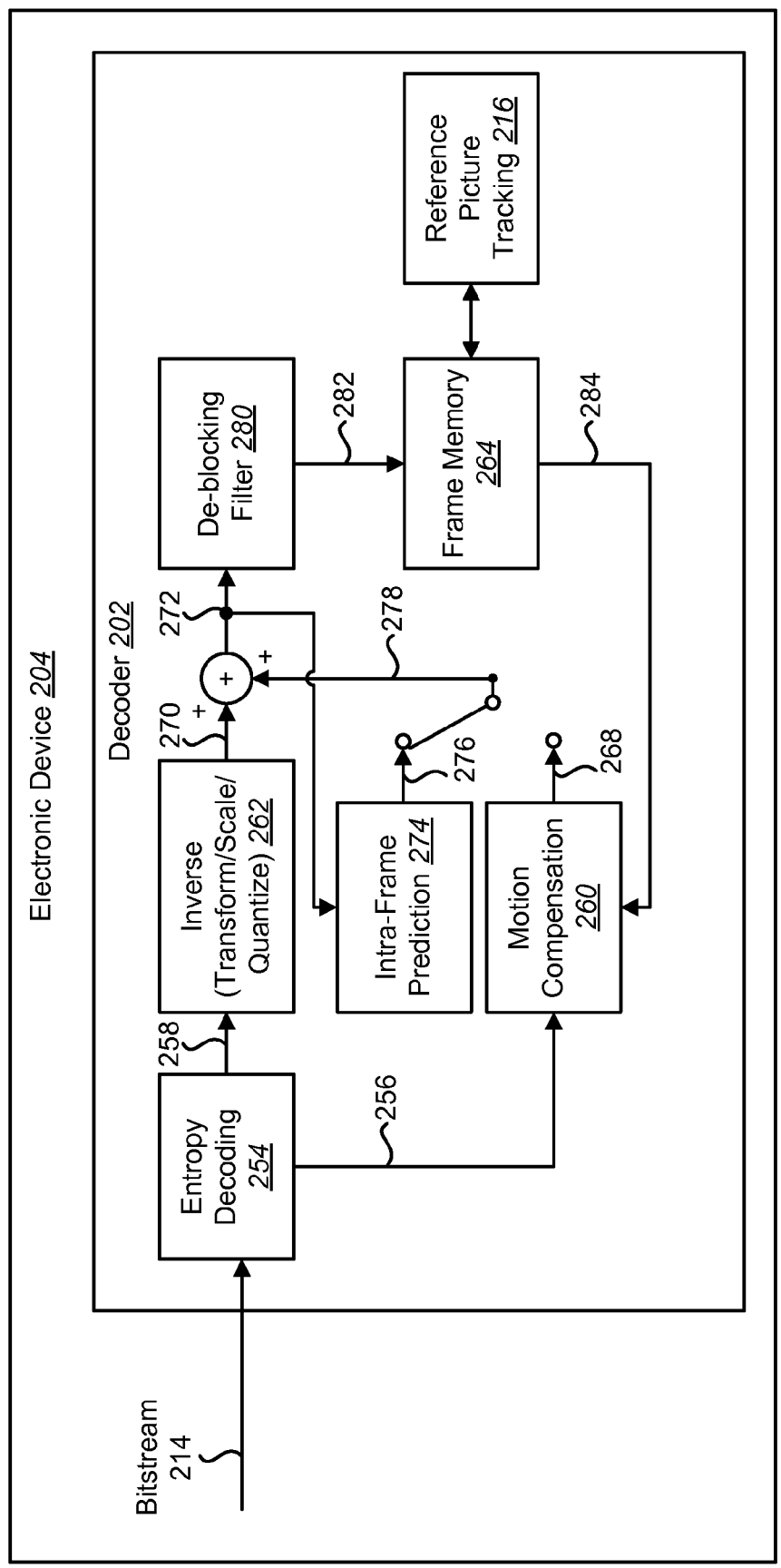
FIG. 2 is a block diagram illustrating one configuration of a decoder.

FIG. 2 is a block diagram illustrating one configuration of a decoder 202. The decoder 202 may be included in an electronic device 204. For example, the decoder 202 may be a high-efficiency video coding (HEVC) decoder. The decoder 202 and/or one or more of the elements illustrated as included in the decoder 202 may be implemented in hardware, software or a combination of both. The decoder 202 may receive a bitstream 214 (e.g., one or more encoded pictures included in the bitstream 214) for decoding. In some configurations, the received bitstream 214 may include received overhead information, such as a received slice header, received PPS, received buffer description information, etc. The encoded pictures included in the bitstream 214 may include one or more encoded reference pictures and/or one or more other encoded pictures.

Received symbols (in the one or more encoded pictures included in the bitstream 214) may be entropy decoded by an entropy decoding module 254, thereby producing a motion information signal 256 and quantized, scaled and/or transformed coefficients 258.

The motion information signal 256 may be combined with a portion of a reference frame signal 284 from a frame memory 264 at a motion compensation module 260, which may produce an inter-frame prediction signal 268. The quantized, descaled and/or transformed coefficients 258 may be inverse quantized, scaled and inverse transformed by an inverse module 262, thereby producing a decoded residual signal 270. The decoded residual signal 270 may be added to a prediction signal 278 to produce a combined signal 272. The prediction signal 278 may be a signal selected from either the inter-frame prediction signal 268 or an intra-frame prediction signal 276 produced by an intra-frame prediction module 274. In some configurations, this signal selection may be based on (e.g., controlled by) the bitstream 214.

The intra-frame prediction signal 276 may be predicted from previously decoded information from the combined signal 272 (in the current frame, for example). The combined signal 272 may also be filtered by a de-blocking filter 280. The resulting filtered signal 282 may be written to frame memory 264. The resulting filtered signal 282 may include a decoded picture.

The frame memory 264 may include a decoded picture buffer (DPB) as described herein. The DPB may include one or more decoded pictures that may be maintained as short or long term reference frames. The frame memory 264 may also include overhead information corresponding to the decoded pictures. For example, the frame memory 264 may include slice headers, picture parameter set (PPS) information, cycle parameters, buffer description information, etc. One or more of these pieces of information may be signaled from an encoder (e.g., encoder 108, overhead signaling module 112).

The decoder 202 may include a reference picture tracking module 216. The reference picture tracking module 216 may track one or more reference pictures in the frame memory 264 with reduced referencing overhead. In one example, the reference picture tracking module 216 may track long term reference pictures using a cycle parameter and modifying (e.g., decrementing) the cycle parameter based on received wrap indicators. In another example, an update of all reference picture cycle parameters may be carried out with respect to the picture being decoded. This update procedure may be executed once for the current picture (e.g., the picture being decoded). The transition between cycles may be kept track of implicitly with the help of the POC. At times the cycle parameter may be increased (when the transition is from picture set 'n' to picture set 'n−1' as may occur in out-of-order picture decoding, for example). Greater detail on one or more approaches to tracking a reference picture is given below.

Some configurations of the systems and methods disclosed herein may use a modified buffer description. Examples of the modified buffer description are given hereafter. The buffer description may be modified to include "POC," "poc_cycle" and "temporalID" for long-term reference pictures. It should be noted that "poc_cycle" may be one example of the cycle parameter described herein. The (modified) buffer descriptions, (modified) syntaxes and/or parameters given in accordance with the systems and methods disclosed herein may enable reduced overhead referencing.

Table (1) below gives one example comparing the buffer description within the PPS in a prior approach and one proposed approach in accordance with the systems and methods disclosed herein. The prior approach is detailed in the "candidate working draft text of ad-hoc group 21" document (AHG21) that was created to further the work in JCTVC-F493. It should be noted that AHG21 (JCTVC-F803) separately groups and specifies "negative pictures" (e.g., those that have negative deltaPOC values) and "positive pictures" (e.g., those pictures that have positive deltaPOC values).

TABLE (1)

| AHG21 Buffer Description | Proposed Buffer Description |
| --- | --- |
| $deltaPOC_0$, $temporalID_0$ | $deltaPOC_0$, $temporalID_0$ |
| $deltaPOC_1$, $temporalID_1$ | $deltaPOC_1$, $temporalID_1$ |
| $deltaPOC_2$, $temporalID_2$ | $deltaPOC_2$, $temporalID_2$ |
| $deltaPOC_3$, $temporalID_3$ | ($POC_0$, $poc\_cycles_0$, $temporalID_3$) |
| $deltaPOC_4$, $temporalID_4$ | ($POC_1$, $poc\_cycles_1$, $temporalID_4$) |

In Table (1) illustrated above, ($POC_0$, $poc\_cycles_0$, $temporalID_3$) and ($POC_1$, $poc\_cycles_1$, $temporalID_4$) represent long-term (reference) pictures. It should be noted that the buffer description may contain two lists POCBD and TemporalIDBD for short-term reference pictures (corresponding to POC and TemporalID fields, respectively). Furthermore, the buffer description may contain three lists: POCBD, POC_CYCLE_BD and TemporalIDBD for long-term reference pictures (corresponding to POC, poc_cycle and TemporalID fields, respectively).

It should be noted that the syntax given in AHG21 does not adequately support fixed long term referencing. Listing (1) below illustrates one example of a bitstream syntax modification required to a candidate working draft text of ad-hoc group 21 (AHG21). The changes due to the prior approach are given in bold text in Listing (1).

Listing (1)

```
/* Picture parameter set RBSP syntax
    ue(v): Unsigned integer, entropy coded variable length
    se(v): Signed integer, entropy coded variable length
    u(x): Unsigned x-bit(s) integer
*/
pic_parameter_set_rbsp( ){
    ...
    bits_for_temporal_id_in_buffer_descriptions //u(2)
    positive_pictures_in_buffer_descriptions_flag //u(1)
    number_of_bds //ue(v)
    if( number_of_bds > 0 ) {
        for(i = 0; i < number_of_bds; i++){
            number_of_negative_pictures_pps[i] //ue(v)
            for( j = 0; j < number_of_negative_pictures_pps[i]; j++ ) {
                ...
            }
            if( positive_pictures_in_buffer_descriptions_flag ){
                number_of_positive_pictures_pps[i] //ue(v)
                for( j = 0; j < number_of_positive_pictures_pps[i]; j++ ) {
                    delta_poc_minus_one_pps[i][j] //ue(v)
                    if( bits_for_temporal_id_in_buffer_descriptions > 0 )
                        temporal_id_positive_pps[i][j] //u(v)
                }
            }
            number_of_longterm_pictures_pps[i] //ue(v)
            for( j = 0; j < number_of_longterm_pictures_pps[i]; j++ ) {
                poc_pps[i][j] //ue(v)
                poc_cycle_pps[i][j] //ue(v) or se(v) may be used
                if( bits_for_temporal_id_in_buffer_descriptions > 0 )
                    temporal_id_poc_pps[i][j] //u(v)
            }
        }
    }
    ...
}
```

Examples of descriptions of the parameters in Listing (1) are given as follows. number_of_longterm_pictures_pps[i]

specifies the number of entries in the list POCBD[i] and POC_CYCLE_BD[i]. The value of number_of_longterm_pictures_pps[i] shall be in the range of 0 to max_num_ref_frames, inclusive. max_num_ref_frames specifies the maximum number of short term and long term reference frames. poc_pps[i][j] specifies POC value and defines the value of the variable POCBD[i][j] as POCBD[i][j]=poc_pps[i][j]. poc_pps[i][j] shall be in the range of 0 to MaxPOC−1.

poc_cycle_pps[i][j] specifies poc_cycle (e.g., the cycle parameter) value and defines the value of the variable POC_CYCLE_BD as: POC_CYCLE_BD[i][j]=poc_cycle_pps[i][j]. poc_cycle_pps[i][j] (e.g., the cycle parameter) may be less than or equal to zero in some configurations. In such a case, a signed integer may be used to represent the cycle parameter. In other configurations, an unsigned integer may be used to represent the cycle parameter.

temporal_id_poc_pps[i][j] specifies a temporal identifier and shall be present if bits_for_temporal_id_in_buffer_descriptions>0. temporal_id_poc_pps[i][j] defines the value of the variable TemporalIDBD_pps[i][j] as TemporalIDBD_pps[i][j]=temporal_id_poc_pps[i][j]. temporal_id_poc_pps[i][j] shall be in the range of 0 to max_temporal_layers_minus1, inclusive. max_temporal_layers_minus1+1 specifies the maximum number of temporal layers present in a sequence.

Listing (2) below illustrates an alternative example configuration where multiple buffer descriptions may be created within a PPS with different cycle parameters (e.g., poc_cycles) using the following syntax. The changes due to the prior approach are given in bold text in Listing (2).

Listing (2)

```
/* Picture parameter set RBSP syntax
   ue(v): Unsigned integer, entropy coded variable length
   se(v): Signed integer, entropy coded variable length
   u(x): Unsigned x-bit(s) integer
*/
pic_parameter_set_rbsp( ){
   ...
   bits_for_temporal_id_in_buffer_descriptions //u(2)
   positive_pictures_in_buffer_descriptions_flag //u(1)
   number_of_bds //ue(v)
   if( number_of bds > 0) {
      for(i = 0; i < number_of_bds; i++){
         number_of_negative_pictures_pps[i] //ue(v)
         for( j = 0; j < number_of_negative_pictures_pps[i]; j++ ) {
            ...
         }
         if( positive_pictures_in_buffer_descriptions_flag ){
            number_of_positive_pictures_pps[i] //ue(v)
            for( j = 0; j < number_of_positive_pictures_pps[i]; j++ ) {
               delta_poc_minus_one_pps[i][j] //ue(v)
               if( bits_for_temporal_id_in_buffer_descriptions > 0 )
                  temporal_id_positive_pps[i][j] //u(v)
            }
         }
         number_of_longterm_pictures_pps[i] //ue(v)
         for( j = 0; j < number_of_longterm_pictures_pps[i]; j++ ) {
            poc_pps[i][j] //ue(v)
            poc_cycle_pps[i][j] //ue(v) or se(v) may be used
            poc_cycle_steps_flag //u(1)
            if (poc_cycle_steps_flag) {
               poc_cycle_steps //ue(v)
            }
            if( bits_for_temporal_id_in_buffer_descriptions > 0 )
               temporal_id_poc_pps[i][j] //u(v)
         }
      }
   ...
   }
}
```

In Listing (2), examples of descriptions of further parameters are given as follows. When set to 1, poc_cycle_steps_flag specifies that additional buffer descriptions shall be generated for the signaled buffer description model that are identical to the signaled buffer description model except for the poc_cycle count. poc_cycle_steps_flag shall be 0 by default. Furthermore, poc_cycle_steps specifies the number of additional buffer descriptions that shall be generated for the signaled buffer description model. The additional buffer descriptions shall be identical to the signaled buffer description except that the poc_cycle count shall be decreased. In one configuration, the additional buffer descriptions generated have poc_cycle_pps[i][j] values of −1, −2, −3, . . . , −(poc_cycle_steps).

Listing (3) illustrates another example of syntax modification for the PPS from AHG21. In particular, Listing (3) illustrates one example of buffer description syntax used in slice headers as outlined in AHG21. However, modifications to the syntax given in AHG21 in accordance with the systems and methods disclosed herein are denoted in bold text in Listing (3).

Listing (3)

```
/* ue(v): Unsigned integer, entropy coded variable length
   se(v): Signed integer, entropy coded variable length
   u(x): Unsigned x-bit(s) integer
*/
buffer_description( ) {
   bd_reference_flag //u(1)
   if(bd_reference_flag = = 1) {
      bd_idx //u(v)
      bd_poc_cycle_update_flag //u(1)
      if (bd_poc_cycle_update_flag = = 1)
         for( j = 0; j < number_of_longterm_pictures_pps[bd_idx]; j++ ) {
            poc_cycle_pps_override[bd_idx][j]//may be ue(v) or se(v)
         }
   } else {
      number_of_negative_pictures //ue(v)
      for( i = 0; i < number_of_negative_pictures; i++ ) {
         ...
      }
      if( positive_pictures_in_buffer_descriptions_flag ){
         ...
      }
      number_of_longterm_pictures //ue(v)
      for( j = 0; j < number_of_longterm_pictures; j++ ) {
         poc[i][j] //ue(v)
         poc_cycle[i][j] //may be ue(v) or se(v)
         if( bits_for_temporal_id_in_buffer_descriptions > 0 )
            temporal_id_poc[i][j] //u(v)
      }
      if( number_of_negative_pictures + number_of_positive_pictures <
         max_num_ref_frames ) {
         combine_with_reference_flag //u(1)
         if( combine_with_reference_flag )
            bd_combination_idx //u(v)
      }
   }
}
```

Examples of descriptions of the parameters in Listing (3) are given as follows. A bd_poc_cycle_update_flag equal to 1 specifies that the poc_cycle_pps[bd_idx][j] of the referenced buffer description should be overridden for the current picture. In some configurations, future frames may also override poc_cycle information. If bd_poc_cycle_update_flag is 0 then the original poc_cycle_pps[bd_idx][j] of the referenced buffer description are to be used. poc_cycle_pps_override[bd_idx][j] specifies the values to be used to override the values within the poc_cycle_pps[bd_idx][j] for the current picture only. In an alternative configuration, poc_cycle_pps_override[bd_idx][j] specifies an offset. For the current picture only, (poc_cycle_pps[bd_idx][j]+poc_cycle_pps_override[bd_idx][j]) may be used instead of poc_cycle_pps[bd_idx][j].

number_of_longterm_pictures[i] specifies the number of entries in the list POCBD[i] and POC_CYCLE_BD[i]. The value of number_of_longterm_pictures[i] shall be in the range of 0 to max_num_ref_frames, inclusive. max_num_ref_frames specifies the maximum number of short term and long term reference frames. poc[i][j] specifies POC value and defines the value of the variable POCBD[i][j] as POCBD[i][j]=poc[i][j]. poc[i][j] shall be in the range of 0 to MaxPOC-1. poc_cycle[i][j] (e.g., the cycle parameter) specifies poc_cycle value and defines the value of the variable POC_CYCLE_BD as PC_CYCLE_BD[i][j]=poc_cycle[i][j]. poc_cycle[i][j] may be less than or equal to zero or may occupy a different numerical range.

temporal_id_poc[i][j] specifies a temporal identifier and shall be represented by bits_for_temporal_id_in_buffer_descriptions bits. temporal_id_poc[i][j] defines the value of the variable TemporalIDBD[i][j] as TemporalIDBD[i][j]=temporal_id_poc[i][j]. temporal_id_poc[i][j] shall be in the range of 0 to max_temporal_layers_minus1, inclusive. max_temporal_layers_minus1+1 specifies the maximum number of temporal layers present in a sequence. In this approach, buffer description B may be omitted from PPS.

In some configurations, number_of_longterm_pictures_pps[bd_idx] may be transmitted before the "for" loop illustrated in Listing (3), thereby avoiding a dependency on a slice header with PPS. Alternatively, bd_poc_cycle_update_flag may be replaced with another parameter, num_longterm_poccycle_override_count. For example, relevant code in Listing (3) above may be replaced with "If num_longterm_poccycle_override_count>0 then For (j=0; j<num_ longterm_poccycle_override_count; j++) { ... }."

Some examples of ways in which the systems and methods described herein may be applied are given hereafter. Assume that a picture with POC=0 on is a long-term (reference) picture used by a picture with POC=MaxPOC-1 and a picture with POC=0 from a subsequent picture set. The long-term (reference) picture may be indicated in different ways.

In a first way, there are two buffer descriptions in the PPS, including buffer description A: {POC=0,poc_cycle=0,temporalID} and buffer description B: {POC=0,poc_cycle=-1, temporalID}. The picture with POC=MaxPOC-1 will point to buffer description A. The picture with POC=0 from the subsequent picture set will refer to buffer description B.

In a second alternative way, the picture with POC=MaxPOC-1 will point to buffer description A. The picture with POC=0 from the subsequent picture set will refer to buffer description A and override the poc_cycle_pps[B][0] value in the slice header to -1.

Some examples of configurations of the systems and methods disclosed herein are given hereafter. In one configuration, the 3-tuple (POC, poc_cycle, temporalID) may be replaced with the 2-tuple (LTSlotIdx, temporalID). LTSlotIndex may be a slot index that points to a location in the long-term DPB. One possible benefit of this approach is to reduce bitrate overhead.

In another configuration, the 3-tuple (POC, poc_cycle, temporalID) may be replaced with (f(POC, poc_cycle), temporalID), where f(POC, poc_cycle) is a function (e.g., look-up table) that maps the two-tuple (POC, poc_cycle) to an index.

In some configurations, some or all information typically contained in the PPS and/or in buffer descriptions may be additionally or alternatively carried in an Adaptive Slice Parameter Set or Adaptation Parameter Set (APS). This information includes one or more of: number_of_longterm_pictures[i], poc[i][j], poc_cycle[i][j], temporal_id_poc[i][j], number_of_longterm_pictures_pps[i], poc_pps [i][j], poc_cycle_pps [i][j] and temporal_id_poc_pps [i][j]. For example, The Adaptive Slice Parameter Set or Adaptation Parameter Set (APS) may include one or more of a number of reference pictures (e.g., number_of_longterm_pictures[i]), a picture order count (e.g., poc[i][j]), a picture order count cycle parameter (e.g., poc_cycle[i][j]), a temporal identifier picture order count parameter (e.g., temporal_id_poc[i][j]), a picture parameter set number of reference pictures (e.g., number_of_longterm_pictures_pps[i]), a picture parameter set picture order count (e.g., poc_pps[i][j]), a picture parameter set picture order count cycle parameter (e.g., poc_cycle_pps [i][j]) and a picture parameter set temporal identifier picture order count parameter (e.g., temporal_id_poc_pps [i][j]).

In some configurations, the information poc_cycle[i][j] may only be signaled (e.g., from an encoder 108 to the decoder 102, 202) if it is different than 0. In this case, an alternate syntax may be defined.

In an yet another configuration, some or all information typically contained in the PPS and/or in the buffer descriptions may additionally or alternatively be carried in a slice header separately from the buffer description information. For example, the slice header may carry (separately from the buffer description container) one or more of a number of reference pictures (e.g., number_of_longterm_pictures[i]), a picture order count (e.g., poc[i][j]), a picture order count cycle parameter (e.g., poc_cycle[i][j]), a temporal identifier picture order count parameter (e.g., temporal_id_poc[i][j]), a picture parameter set number of reference pictures (e.g., number_of_longterm_pictures_pps[i]), a picture parameter set picture order count (e.g., poc_pps[i][j]), a picture parameter set picture order count cycle parameter (e.g., poc_cycle_pps [i][j]) and a picture parameter set temporal identifier picture order count parameter (e.g., temporal_id_poc_pps[i][j]).

In an alternative configuration, a long term (reference) picture may be signaled by indexing it as x.y, where x=poc[i][j] or poc_pps[i][j] and y is a new information subindex that defines an additional namespace/numberspace for subindexing long term (reference) pictures. In this case, the x and y entries may be sent in PPS and/or buffer descriptions (in a slice header) for each long term (reference) picture.

In some configurations, all (reference) pictures (e.g., long-term and short-term) are referenced using either delta referencing (using deltaPOC and temporalID, for example) or absolute referencing (using POC, poc_cycle and temporalID, for example). For example, the entire decoded picture buffer (DPB) may contain a set of received pictures. A subset of these received pictures may use delta referencing and the remaining received pictures may use absolute referencing. It should be noted that prior approaches do not specify the same absolute referencing as given in accordance with the systems and methods disclosed herein (using POC and poc_cycle, for example). It should be noted that one or more of the configurations of buffer descriptions and syntaxes described may be implemented in combination with one or more of the methods and/or approaches described herein.

Figure 3:
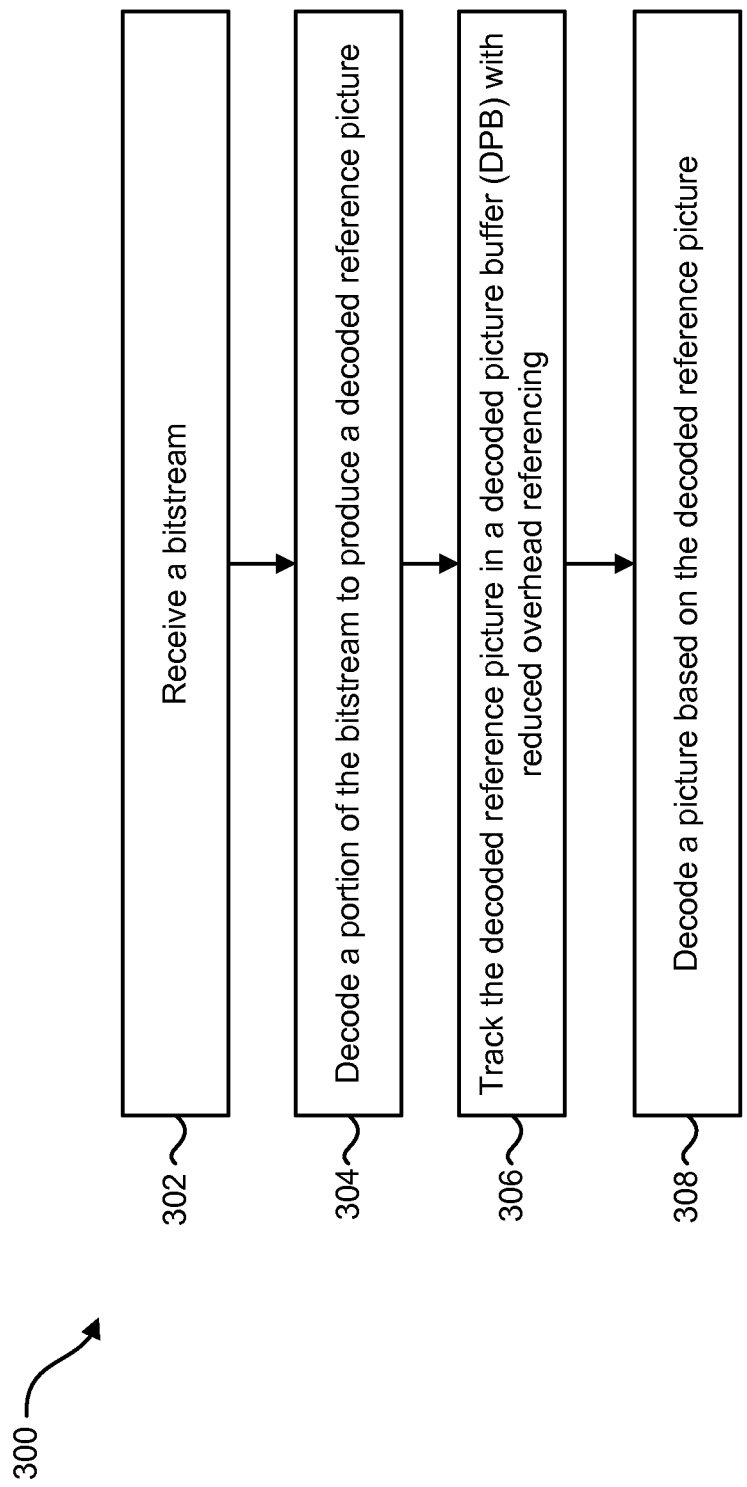
FIG. 3 is a flow diagram illustrating one configuration of a method for tracking a reference picture with reduced overhead referencing.

FIG. 3 is a flow diagram illustrating one configuration of a method 300 for tracking a reference picture with reduced overhead referencing. An electronic device 204 (e.g., decoder 202) may receive 302 a bitstream. For example, the decoder 202 may receive 302 a bitstream 214 that includes an encoded reference picture (and other encoded pictures, for instance). In some configurations, the bitstream 214 may also include overhead information (e.g., PPS, buffer description information, parameters, wrap indicators, reference picture designation or identifier, etc.).

The electronic device 204 may decode 304 a portion of the bitstream 214 to produce a decoded reference picture. For example, the decoder 202 may decode 304 a portion of the bitstream 214 to produce a decoded reference picture that is stored in frame memory 264. It should be noted that one or more portions of the bitstream 214 may be decoded 304 to produce one or more decoded reference pictures.

The electronic device 204 may track 306 the decoded reference picture in a decoded picture buffer (DPB) with reduced overhead referencing. For example, the electronic device 204 may associate a cycle parameter with the decoded reference picture and modify (e.g., decrement or increment) the cycle parameter if a wrap indicator is received or if a transition between picture sets is determined. Other approaches may be used for tracking 306 the decoded reference picture. Greater detail is given below. It should be noted that the DPB may include one or more decoded reference pictures.

The electronic device 204 may decode 308 the picture based on one or more decoded reference pictures. For example, a portion of the bitstream 214 (other than the portion decoded 304 to produce the decoded reference picture) may be decoded 308 based on the reference picture. For instance, the decoded reference picture (that has been tracked in the DPB) may be provided to a motion compensation module 260 in order to generate an inter-frame prediction signal 268 based on an inter-frame prediction mechanism. The inter-frame prediction signal 268 may then be used to decode 310 the picture. In some configurations or instances, one or more decoded reference pictures may be tracked 306 and used to decode 308 the picture.

Figure 4:
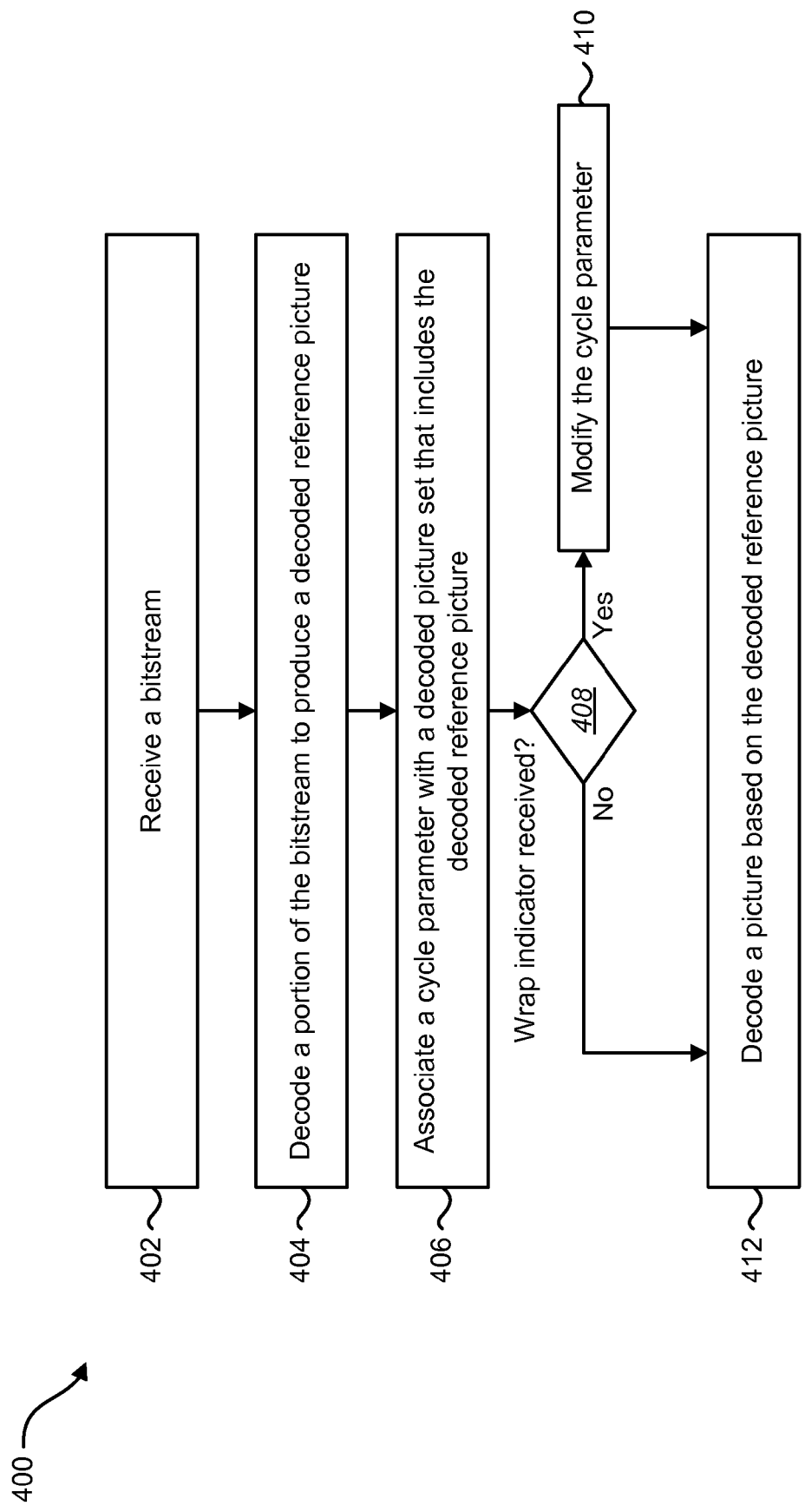
FIG. 4 is a flow diagram illustrating a more specific configuration of a method for tracking a reference picture with reduced overhead referencing.

FIG. 4 is a flow diagram illustrating a more specific configuration of a method 400 for tracking a reference picture with reduced overhead referencing. This method 400 may be one approach for tracking which picture is being referenced when POCs are reused. An electronic device 204 (e.g., decoder 202) may receive 402 a bitstream 214. For example, the decoder 202 may receive 402 a bitstream 214 that includes an encoded reference picture (and other encoded pictures, for instance). In some configurations, the bitstream 214 may include overhead information (e.g., PPS, buffer description information, parameters, wrap indicators, reference picture designation or identifier, etc.).

The electronic device 204 may decode 404 a portion of the bitstream 214 to produce a decoded reference picture. For example, the decoder 202 may decode 404 a portion of the bitstream 214 to produce a decoded reference picture that is stored in frame memory 264. It should be noted that one or more portions of the bitstream 214 may be decoded 404 to produce one or more decoded reference pictures.

The electronic device 204 may associate 406 a cycle parameter with a decoded picture set that includes the decoded reference picture. For example, the electronic device 204 may associate 406 a cycle parameter "poc_cycle" with a decoded picture set that includes the decoded reference picture.

The cycle parameter "poc_cycle" may be defined as follows. When a fixed number of bits are used to represent the POC of a picture in a range [0, ..., MaxPOC−1], MaxPOC unique integer values exist. If the number of pictures being encoded exceeds MaxPOC, a picture numbering mechanism must reuse already assigned POC values. The POC numbering then progresses as follows in one example: ..., [0, ..., MaxPOC−1]$_{n-2}$, [0, ..., MaxPOC−1]$_{n-1}$, [0, ..., MaxPOC−1]$_n$, [0, ..., MaxPOC−1]$_{n+1}$ .... The subscript in this example denotes the number of times the set [0, ..., MaxPOC−1] has been repeated. This subscript or the number of times the set [0, ..., MaxPOC−1] has been repeated may be denoted as MaxPOCSetIndex. For example, a picture with POC=0 and MaxPOCSetIndex=n represents the (n*MaxPOC+1)$^{th}$ picture of the sequence (with an assumption that picture set numbering starts with 1, for instance). Additional detail regarding the cycle parameter "poc_cycle" is given in connection with FIG. 5 below.

The electronic device 204 may determine 408 whether a wrap indicator is received. For example, each time an encoder 108 or transmitting electronic device A 104a reaches a predetermined maximum number of pictures in a set of pictures, the encoder 108 or transmitting electronic device A 104a may send a wrap indicator that is received by the decoder 102 or receiving electronic device B 104b to indicate that another set of pictures is being sent (e.g., a POC is resetting or starting another cycle). Greater detail is given in connection with FIG. 6 below.

If the electronic device 204 determines 408 that a wrap indicator was received, the electronic device 204 may modify 410 (e.g., decrement) the cycle parameter. For example, the electronic device 204 decrements cycle parameters for each picture or each set of pictures in the DPB. In another example, the electronic device 204 may increment the cycle parameter.

The electronic device 204 may decode 412 a picture based on the decoded reference picture. For example, a portion of the bitstream 214 (other than the portion decoded 404 to produce the decoded reference picture) may be decoded 412 based on the reference picture. For instance, the decoded reference picture (that has been tracked in the DPB) may be provided to a motion compensation module 260 in order to generate an inter-frame prediction signal 268 based on an inter-frame prediction mechanism. The inter-frame prediction signal 268 may then be used to decode 412 the picture. In some configurations or instances, one or more decoded reference pictures may be used to decode 412 the picture.

Figure 5:
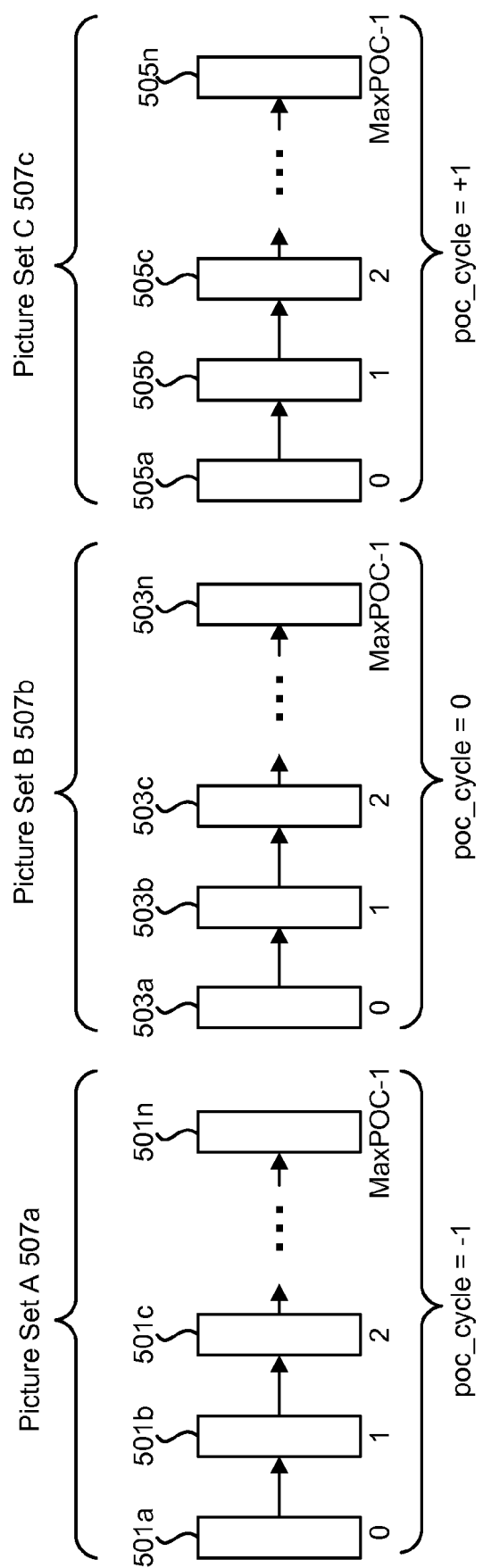
FIG. 5 is a diagram illustrating one example of multiple picture sets referenced by cycle parameters.

FIG. 5 is a diagram illustrating one example of multiple picture sets referenced by cycle parameters. More specifically, FIG. 5 illustrates an example of tracking a reference picture with reduced overhead referencing using a cycle parameter. In particular, FIG. 5 illustrates a cycle parameter (e.g., poc_cycle=−1) associated with picture set A 507a, a cycle parameter (e.g., poc_cycle=0) associated with picture set B 507b and a cycle parameter (e.g., poc_cycle=+1) associated with picture set C 507c. However, it should be noted that picture set A 507a may or may not be the first picture set in a sequence of frames. For example, one or more picture sets may precede picture set A 507a. Furthermore, it should be noted that picture set C 507c may or may not be the last picture set in a sequence of frames. For example, one or more picture sets may follow picture set C 507c.

Each picture set 507a-c may include one or more pictures 501a-n, 503a-n, 505a-n. In this example, each picture set 507a-c includes MaxPOC pictures 501, 503, 505. In particular, each picture 501, 503, 505 may have a corresponding picture order count (POC), denoted as [0, 1, 2, ..., MaxPOC−1] in FIG. 5.

In one example, the poc_cycle of the current decoded picture may be set to 0 for computing the poc_cycle of other pictures. In some cases, pictures may be decoded out of order. For example, a decoder may see 503b, then 505a and then 503c. In this example, assume that a picture being currently decoded is a picture 503b in picture set B 507b with POC=1.

The poc_cycle of another picture, such as a reference picture, may then be calculated based on the poc_cycle of the current decoded picture.

Figure 6:
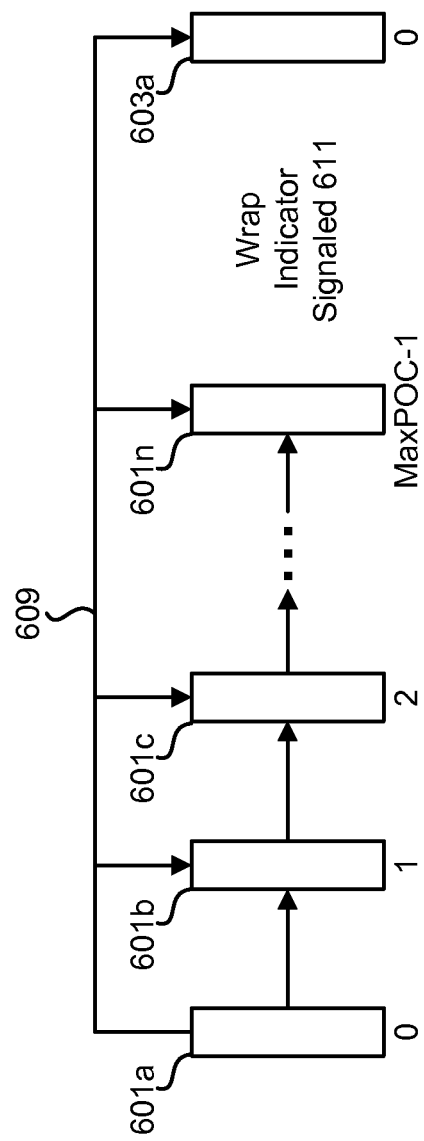
FIG. 6 is a diagram illustrating one example of signaling a wrap indicator in accordance with the systems and methods disclosed herein.

FIG. 6 is a diagram illustrating one example of signaling a wrap indicator in accordance with the systems and methods disclosed herein. In this example, several pictures 601a-n, 603a are illustrated. The first picture 601a with POC=0 is a reference picture for the remainder of the pictures 601b-n, 603a illustrated in FIG. 6. In particular, FIG. 6 illustrates an association or correspondence 609 between the reference picture 601a and the other pictures 601b-n, 603a. For example, the picture 601a with POC=0 may be a long term reference picture 601a to be kept in the DPB for decoding other pictures 601b-n, 603a.

As illustrated in FIG. 6, POC numbers 0 through MaxPOC-1 and a reused 0 may respectively correspond to the pictures 601a-n, 603a. A first set of pictures 601-n may correspond to POC numbers 0 through MaxPOC-1. As described above, each set of pictures (with POC numbers 0 through MaxPOC-1) may correspond to a cycle parameter (e.g., poc_cycle).

In one configuration, a wrap indicator may be signaled 611 at the first transition between one picture set and a subsequent later picture set. For example, the first time the POC numbering transitions from one [0, . . . , MaxPOC-1] set to the next, the wrap indicator may be signaled 611. In some configurations, the wrap indicator signaled may be a protected message denoted "poc_wraparound." As used herein, "signaled" may mean communicated between an encoder and a decoder. In some configurations, "signaled" may also mean communicated between different electronic devices.

A protected message may be a message that must be received by the electronic device 204 in order to maintain a desired functionality such as detection of lost pictures. One mechanism to transmit a message as a protected message is to assign a higher priority to the protected message when compared to other information messages. An intelligent device (e.g., a network congestion control agent) may then examine this priority assignment and drop lower priority messages to meet constraints such as available network bandwidth.

In some configurations, the wrap indicator (e.g., poc_wraparound) message may be signaled in the Picture Parameter Set (PPS), Slice Header, Adaptive Parameter Set (APS) or any suitable location in the bitstream. Additionally or alternatively, the wrap indicator may be signaled out-of-band (e.g., separate from the picture bitstream). Each time the wrap indicator (e.g., poc_wraparound message) is received by the decoder 102, the cycle parameter (e.g., poc_cycle) for every picture (e.g., every picture set) in the DPB may be decremented (by 1, for example).

Figure 7:
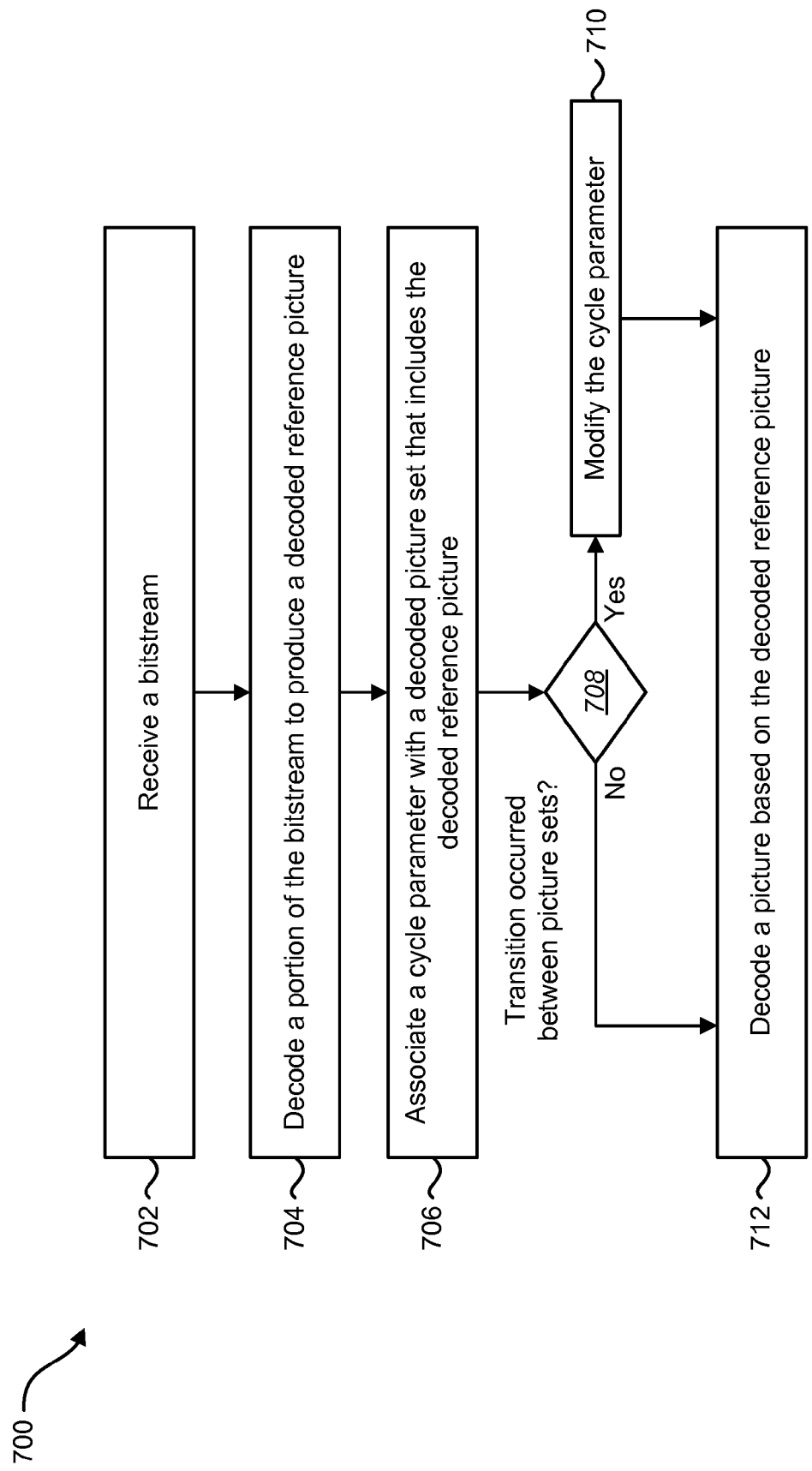
FIG. 7 is a flow diagram illustrating another more specific configuration of a method for tracking a reference picture with reduced overhead referencing.

FIG. 7 is a flow diagram illustrating another more specific configuration of a method 700 for tracking a reference picture with reduced overhead referencing. This method 700 may be another approach for tracking which picture is being referenced when POCs are reused. An electronic device 204 (e.g., decoder 202) may receive 702 a bitstream. For example, the decoder 202 may receive 702 a bitstream 214 that includes an encoded reference picture. In some configurations, the bitstream 214 may also include overhead information (e.g., PPS, buffer description information, parameters, reference picture designation or identifier, etc.).

The electronic device 204 may decode 704 a portion of the bitstream to produce a decoded reference picture. For example, the decoder 202 may decode 704 a portion of the bitstream 214 to produce a decoded reference picture that is stored in frame memory 264. It should be noted that one or more portions of the bitstream 214 may be decoded 404 to produce one or more decoded reference pictures.

The electronic device 204 may associate 706 a cycle parameter with a decoded picture set that includes the decoded reference picture. For example, the electronic device 204 may associate 706 a cycle parameter "poc_cycle" with a decoded picture set or each picture in a decoded picture set that includes the decoded reference picture. The cycle parameter "poc_cycle" is described in greater detail above.

The electronic device 204 may determine 708 whether a transition has occurred between picture sets. For example, the transition may be determined 708 by examining the POC of a current picture being decoded (e.g., CurPOC) and comparing it to the POC of the last picture that was decoded (e.g., LastPOC). For instance, if the POC of the current picture (e.g., CurPOC) being decoded is less than the POC of the last decoded picture (e.g., LastPOC) and LastPOC−CurPOC is greater than a threshold TH_FWD, then a transition from an earlier picture set to a later picture set may be determined 708. However, if the POC of the current picture being decoded (e.g., CurPOC) is greater than the POC of the last picture that was decoded (e.g., LastPOC) and CurPOC−LastPOC is greater than a threshold TH_BCKWD, then a transition from a later picture set to an earlier picture set may be determined 708. For all other cases, it may be determined 708 that no transition has occurred. In some configurations, the thresholds may take on values TH_FWD=TH_BCKWD=MaxPOC/2.

If the electronic device 204 determines 708 that a transition has occurred between two picture sets, the electronic device 204 may modify 710 the cycle parameter. For example, the electronic device 204 may decrement cycle parameters for each picture or each set of pictures in the DPB when the transition is from an earlier picture set. In another example, the electronic device 204 may increment the cycle parameters for each picture or each set of pictures in the DPB when the transition is from a later picture set. Thus, an update of all reference picture cycle parameters may be carried out with respect to the picture being decoded. This update procedure (e.g., determining 708 whether a transition has occurred between picture sets and possibly modifying 710 the cycle parameter(s)) may be executed once for each picture being decoded.

One alternative definition of the cycle parameter "poc_cycle" may be that the poc_cycle for the picture (currently) being decoded is 0. Thus, the set of pictures that includes the picture currently being decoded may be 0.

The poc_cycle of any other picture, such as the reference picture, may be calculated as the MaxPOCSetIndex of the reference picture minus the MaxPOCSetIndex of the picture being decoded. For example, if the MaxPOCSetIndex of the picture being decoded is n and the reference picture has a MaxPOCSetIndex that is n−1, then the poc_cycle of the reference picture may be (n−1)−n=−1.

It should be noted that the poc_cycle for a reference picture may depend on the MaxPOCSetIndex distance between the reference picture and the picture being decoded. This can be determined implicitly by keeping track of transitions (e.g., determining 708 whether a transition has occurred) between one picture set of [0, . . . , MaxPOC-1] and the other picture set [0, . . . , MaxPOC-1] at both the encoder 108 and decoder 102.

The electronic device 204 may decode 712 a picture based on the decoded reference picture. For example, a portion of the bitstream 214 (other than the portion decoded 704 to produce the decoded reference picture) may be decoded 712 based on the decoded reference picture. For example, the decoded reference picture (that has been tracked in the DPB) may be provided to a motion compensation module 260 in order to generate an inter-frame prediction signal 268 based on an inter-frame prediction mechanism. The inter-frame prediction signal 268 may then be used to decode 712 the picture. In some configurations or instances, one or more decoded reference pictures may be used to decode 712 the picture.

Figure 8:
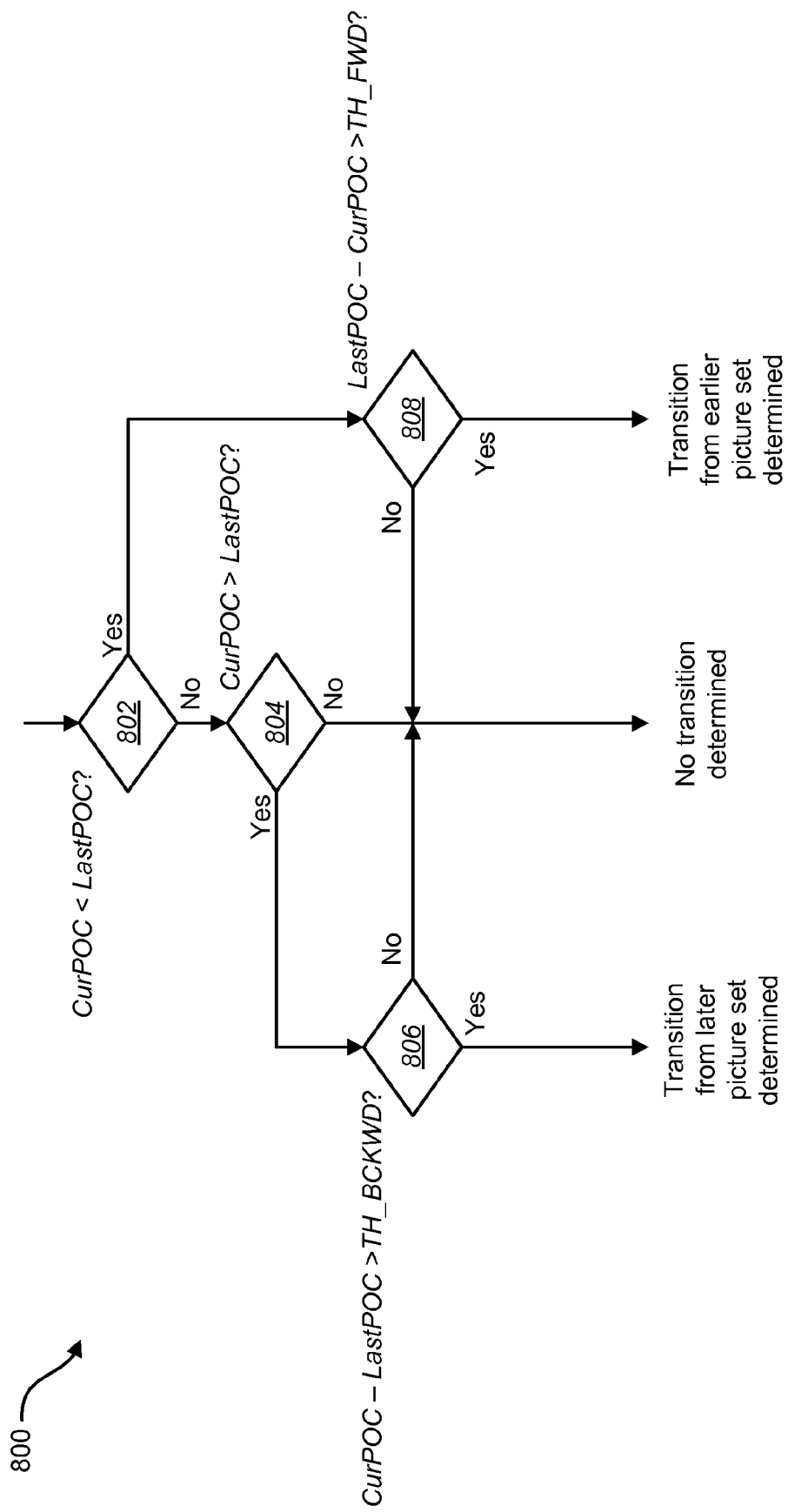
FIG. 8 is a flow diagram illustrating one configuration of a method 800 for determining whether a transition has occurred between picture sets.

FIG. 8 is a flow diagram illustrating one configuration of a method 800 for determining whether a transition has occurred between picture sets. For example, FIG. 8 provides one example of determining 708 whether a transition has occurred between picture sets as illustrated in FIG. 7. The electronic device 204 may determine 802 whether the POC of the current picture being decoded (denoted "CurPOC," for example) is less than the POC of the last decoded picture (denoted "LastPOC," for example). For instance, the electronic device 204 may compare a POC of a current picture being decoded (e.g., CurPOC) to a POC of a picture that was decoded last (e.g., LastPOC) to make this determination 802.

If CurPOC<LastPOC, the electronic device 204 may determine 808 whether LastPOC−CurPOC is greater than a threshold TH_FWD. If LastPOC−CurPOC is greater than a threshold TH_FWD, the electronic device 204 may determine 808 that a transition from an earlier picture set to a later picture set has occurred. However, if LastPOC−CurPOC is not greater than TH_FWD, the electronic device 204 may determine 808 that no transition has occurred.

If CurPOC is not less than LastPOC, then the electronic device 204 may determine 804 whether CurPOC is greater than LastPOC. If the electronic device 204 determines 804 that CurPOC is greater than LastPOC, then the electronic device 204 may determine 806 whether CurPOC−LastPOC is greater than a threshold TH_BCKWD. If the electronic device determines 806 that CurPOC−LastPOC is greater than a threshold TH_BCKWD, then the electronic device 204 may determine 806 that a transition from a later picture set to an earlier picture set has occurred. If the electronic device determines 806 that CurPOC−LastPOC is not greater than a threshold TH_BCKWD, then the electronic device 204 may determine 806 that no transition has occurred.

If the electronic device 204 determines 804 that CurPOC is not greater than LastPOC, the electronic device may determine 804 that no transition has occurred. In some configurations, the thresholds may take on values TH_FWD=TH_BCKWD=MaxPOC/2.

Figure 9:
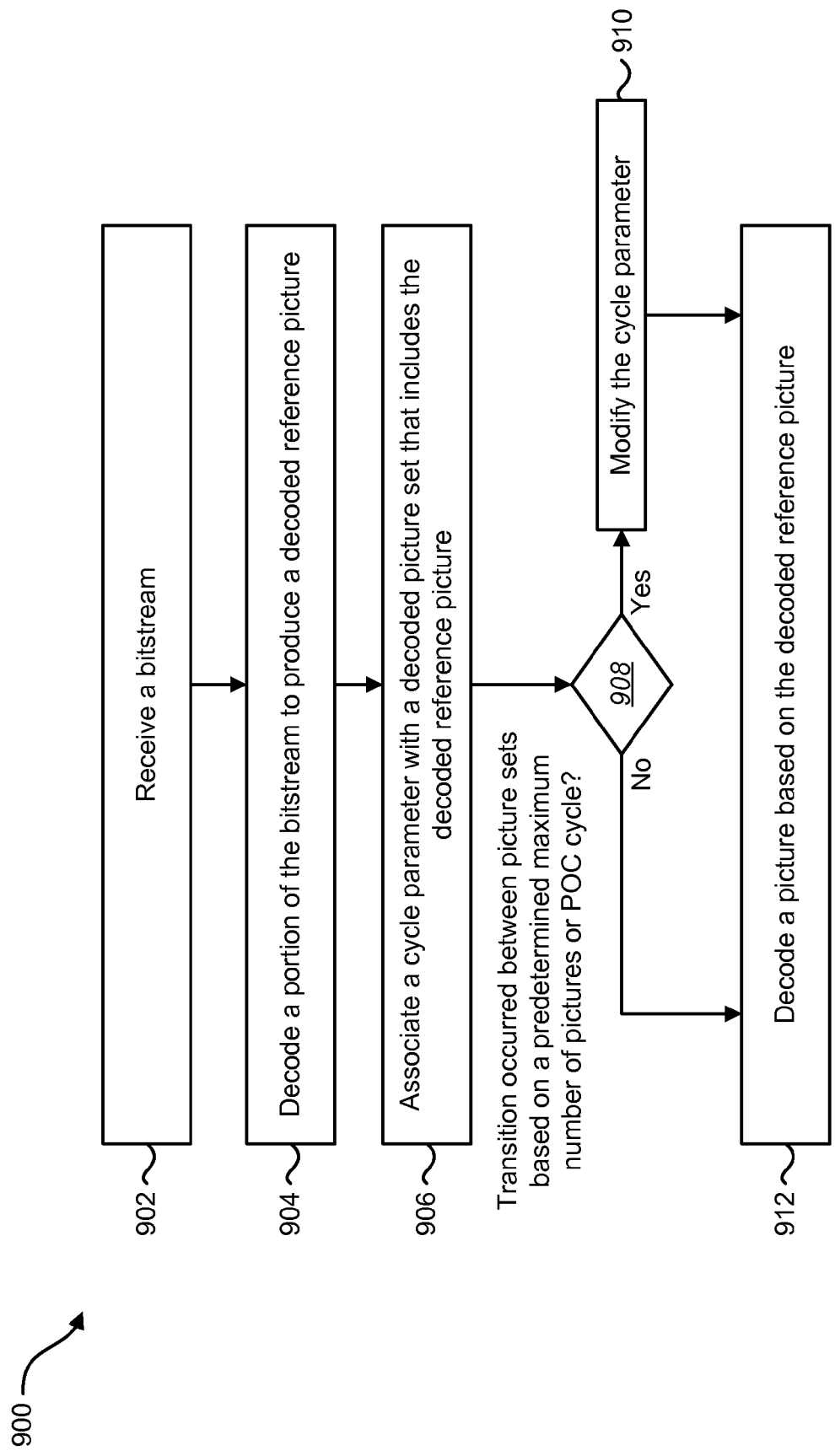
FIG. 9 is a flow diagram illustrating another more specific configuration of a method for tracking a reference picture with reduced overhead referencing.

FIG. 9 is a flow diagram illustrating another more specific configuration of a method 900 for tracking a reference picture with reduced overhead referencing. This method 900 may be one approach for tracking which picture is being referenced when POCs are reused. An electronic device 204 (e.g., decoder 202) may receive 902 a bitstream 214. For example, the decoder 202 may receive 902 a bitstream 214 that includes an encoded reference picture (and other encoded pictures, for instance). In some configurations, the bitstream 214 may include overhead information (e.g., PPS, buffer description information, parameters, reference picture designation or identifier, etc.).

The electronic device 204 may decode 904 a portion of the bitstream 214 to produce a decoded reference picture. For example, the decoder 202 may decode 904 a portion of the bitstream 214 to produce a decoded reference picture that is stored in frame memory 264. It should be noted that one or more portions of the bitstream 214 may be decoded 904 to produce one or more decoded reference pictures.

The electronic device 204 may associate 906 a cycle parameter with a decoded picture set that includes the decoded reference picture. For example, the electronic device 204 may associate 906 a cycle parameter "poc_cycle" with a decoded picture set that includes the decoded reference picture.

The electronic device 204 may determine 908 whether a transition has occurred between picture sets. For example, each time a decoder 102 receives a predetermined maximum number of pictures in a set of pictures (and receives an additional picture), the decoder 102 or electronic device B 104*b* may determine 908 that a transition has occurred between two picture sets. In another example, each time a decoder 102 detects a cycle in POC (e.g., restarting from a maximum value to a minimum value), the decoder 102 or electronic device B 104*b* may determine 908 that a transition has occurred between two picture sets.

If the electronic device 204 determines 908 that a transition has occurred between picture sets, the electronic device 204 may modify 910 (e.g., decrement) the cycle parameter. For example, the electronic device 204 decrements cycle parameters for each picture or each set of pictures in the DPB. In another example, the electronic device 204 may increment the cycle parameter.

The electronic device 204 may decode 912 a picture based on the decoded reference picture. For example, a portion of the bitstream 214 (other than the portion decoded 904 to produce the decoded reference picture) may be decoded 912 based on the reference picture. For instance, the decoded reference picture (that has been tracked in the DPB) may be provided to a motion compensation module 260 in order to generate an inter-frame prediction signal 268 based on an inter-frame prediction mechanism. The inter-frame prediction signal 268 may then be used to decode 912 the picture. In some configurations or instances, one or more decoded reference pictures may be used to decode 912 the picture.

Figure 10:
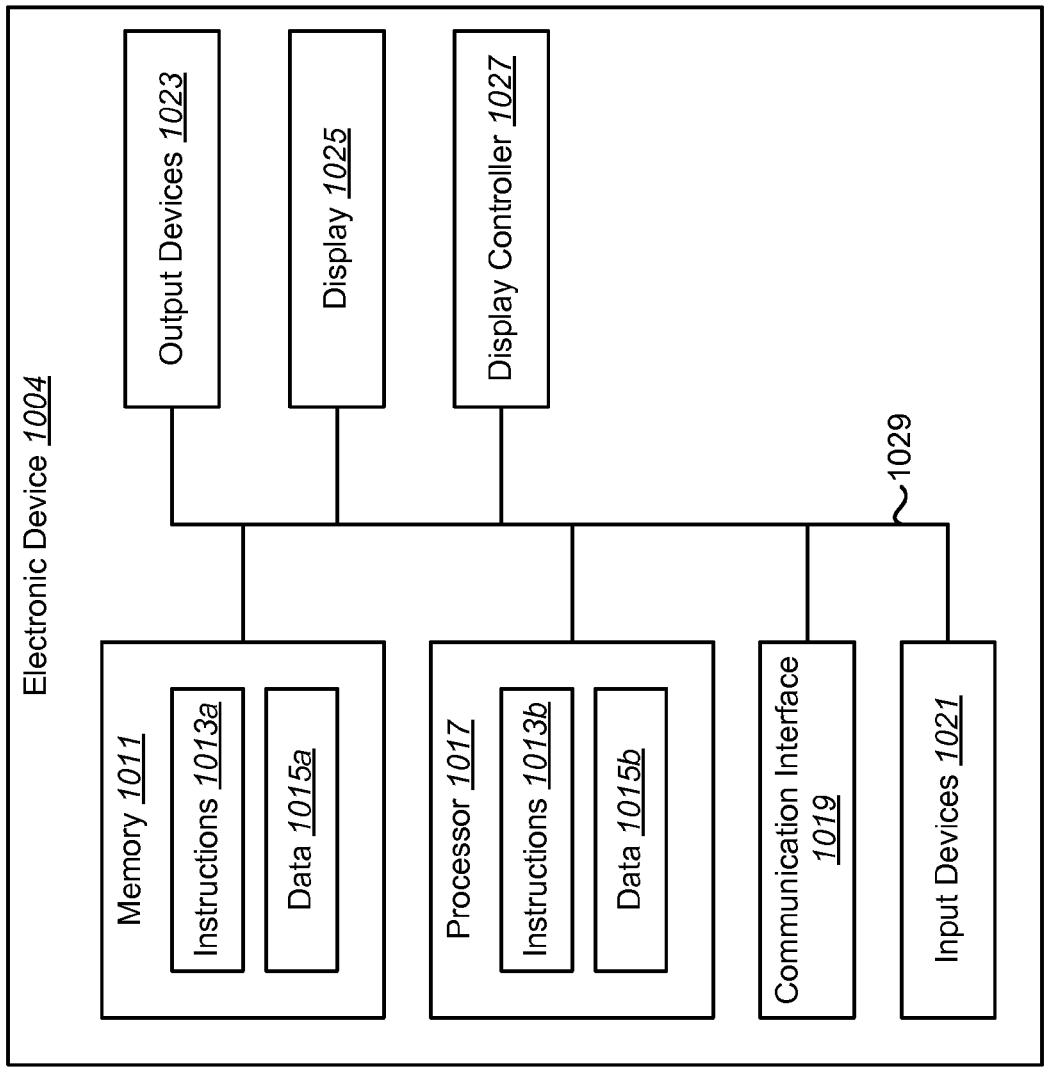
FIG. 10 illustrates various components that may be utilized in an electronic device.

FIG. 10 illustrates various components that may be utilized in an electronic device 1004. The electronic device 1004 may be implemented as one or more of the electronic devices (e.g., electronic devices 104, 204) described previously.

The electronic device 1004 includes a processor 1017 that controls operation of the electronic device 1004. The processor 1017 may also be referred to as a CPU. Memory 1011, which may include both read-only memory (ROM), random access memory (RAM) or any type of device that may store information, provides instructions 1013*a* (e.g., executable instructions) and data 1015*a* to the processor 1017. A portion of the memory 1011 may also include non-volatile random access memory (NVRAM). The memory 1011 may be in electronic communication with the processor 1017.

Instructions 1013*b* and data 1015*b* may also reside in the processor 1017. Instructions 1013*b* and/or data 1015*b* loaded into the processor 1017 may also include instructions 1013*a* and/or data 1015*a* from memory 1011 that were loaded for execution or processing by the processor 1017. The instructions 1013*b* may be executed by the processor 1017 to implement the systems and methods disclosed herein.

The electronic device 1004 may include one or more communication interfaces 1019 for communicating with other electronic devices. The communication interfaces 1019 may be based on wired communication technology, wireless communication technology, or both. Examples of communication interfaces 1019 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with $3^{rd}$ Generation Partnership Project (3GPP) specifications and so forth.

The electronic device 1004 may include one or more output devices 1023 and one or more input devices 1021. Examples of output devices 1023 include a speaker, printer, etc. One type of output device that may be included in an electronic device 1004 is a display device 1025. Display devices 1025 used with configurations disclosed herein may utilize any suitable image projection technology, such as a cathode ray tube (CRT), liquid crystal display (LCD), light-emitting diode (LED), gas plasma, electroluminescence or the like. A display controller 1027 may be provided for converting data stored in the memory 1011 into text, graphics, and/or moving images (as appropriate) shown on the display 1025. Examples of input devices 1021 include a keyboard, mouse, microphone, remote control device, button, joystick, trackball, touchpad, touchscreen, lightpen, etc.

The various components of the electronic device 1004 are coupled together by a bus system 1029, which may include a power bus, a control signal bus and a status signal bus, in addition to a data bus. However, for the sake of clarity, the various buses are illustrated in FIG. 10 as the bus system 1029. The electronic device 1004 illustrated in FIG. 10 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods or approaches described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for tracking a reference picture on an electronic device, comprising:
   receiving a bitstream;
   decoding a portion of the bitstream to produce a decoded reference picture;
   tracking the decoded reference picture in a decoded picture buffer (DPB) with reduced overhead referencing, wherein tracking the decoded reference picture comprises associating a picture order count (POC) cycle parameter with a decoded picture set that includes the decoded reference picture, and wherein the POC cycle parameter indicates which decoded picture set the decoded reference picture belongs to when already assigned POC values are reused; and
   decoding a picture based on the decoded reference picture.

2. The method of claim 1, wherein tracking the decoded reference picture comprises:
   determining whether a wrap indicator is received; and
   modifying the POC cycle parameter if a wrap indicator is received.

3. The method of claim 1, wherein tracking the decoded reference picture comprises:
   determining whether a transition has occurred between picture sets; and
   modifying the POC cycle parameter if the transition has occurred.

4. The method of claim 3, wherein determining whether a transition has occurred between picture sets comprises:
   determining whether a first picture order count (POC) of a current picture being decoded is less than a second POC of a last decoded picture and whether the second POC minus the first POC is greater than a first threshold;
   determining that a transition from an earlier picture set has occurred if the first POC is less than the second POC and if the second POC minus the first POC is greater than the first threshold;
   determining whether the first POC is greater than the second POC and whether the first POC minus the second POC is greater than a second threshold;
   determining that a transition from a later picture set has occurred if the first POC is greater than the second POC and if the first POC minus the second POC is greater than the second threshold; and
   determining that no transition has occurred otherwise.

5. The method of claim 1, wherein a buffer description of the decoded reference picture comprises a picture order count (POC), the POC cycle parameter and a temporal identifier.

6. The method of claim 1, wherein a buffer description of the decoded reference picture comprises a slot index that points to a location in the DPB.

7. The method of claim 1, wherein a buffer description of the decoded reference picture comprises:
   a function of a picture order count (POC) and the POC cycle parameter; and
   a temporal identifier.

8. The method of claim 1, wherein an adaptive slice parameter set or adaptation parameter set (APS) includes at least one of the group consisting of a number of reference pictures, a picture order count, the POC cycle parameter, a temporal identifier picture order count parameter, a picture parameter set number of reference pictures, a picture parameter set picture order count, a picture parameter set picture order count cycle parameter and a picture parameter set temporal identifier picture order count parameter.

9. The method of claim 1, wherein a received slice header includes at least one of the group consisting of a number of reference pictures, a picture order count, the POC cycle parameter, a temporal identifier picture order count parameter, a picture parameter set number of reference pictures, a picture parameter set picture order count, a picture parameter set picture order count cycle parameter and a picture parameter set temporal identifier picture order count parameter separately from buffer description information.

10. The method of claim 1, wherein tracking the decoded reference picture is based on an information subindex and a picture order count parameter or a picture parameter set (PPS) picture order count parameter.

11. The method of claim 1, wherein a subset of received pictures are referenced using delta referencing and a subset of received pictures are referenced using absolute referencing.

12. The method of claim 1, wherein the POC cycle parameter is represented by one of the group consisting of a signed integer and an unsigned integer.

13. The method of claim 1, wherein decoding the picture is based on one or more decoded reference pictures.

14. An electronic device configured for tracking a reference picture, comprising:
a processor;
memory in electronic communication with the processor;
instructions stored in the memory, the instructions being executable to:
receive a bitstream;
decode a portion of the bitstream to produce a decoded reference picture;
track the decoded reference picture in a decoded picture buffer (DPB) with reduced overhead referencing, wherein tracking the decoded reference picture comprises associating a picture order count (POC) cycle parameter with a decoded picture set that includes the decoded reference picture, and wherein the POC cycle parameter indicates which decoded picture set the decoded reference picture belongs to when already assigned POC values are reused; and
decode a picture based on the decoded reference picture.

15. The electronic device of claim 14, wherein tracking the decoded reference picture comprises:
determining whether a wrap indicator is received; and
modifying the POC cycle parameter if a wrap indicator is received.

16. The electronic device of claim 14, wherein tracking the decoded reference picture comprises:
determining whether a transition has occurred between picture sets; and
modifying the POC cycle parameter if the transition has occurred.

17. The electronic device of claim 16, wherein determining whether a transition has occurred between picture sets comprises:
determining whether a first picture order count (POC) of a current picture being decoded is less than a second POC of a last decoded picture and whether the second POC minus the first POC is greater than a first threshold;
determining that a transition from an earlier picture set has occurred if the first POC is less than the second POC and if the second POC minus the first POC is greater than the first threshold;
determining whether the first POC is greater than the second POC and whether the first POC minus the second POC is greater than a second threshold;
determining that a transition from a later picture set has occurred if the first POC is greater than the second POC and if the first POC minus the second POC is greater than the second threshold; and
determining that no transition has occurred otherwise.

18. The electronic device of claim 14, wherein a buffer description of the decoded reference picture comprises a picture order count (POC), the POC cycle parameter and a temporal identifier.

19. The electronic device of claim 14, wherein a buffer description of the decoded reference picture comprises a slot index that points to a location in the DPB.

20. The electronic device of claim 14, wherein a buffer description of the decoded reference picture comprises:
a function of a picture order count (POC) and the POC cycle parameter; and
a temporal identifier.

21. The electronic device of claim 14, wherein an adaptive slice parameter set or adaptation parameter set (APS) includes at least one of the group consisting of a number of reference pictures, a picture order count, the POC cycle parameter, a temporal identifier picture order count parameter, a picture parameter set number of reference pictures, a picture parameter set picture order count, a picture parameter set picture order count cycle parameter and a picture parameter set temporal identifier picture order count parameter.

22. The electronic device of claim 14, wherein a received slice header includes at least one of the group consisting of a number of reference pictures, a picture order count, the POC cycle parameter, a temporal identifier picture order count parameter, a picture parameter set number of reference pictures, a picture parameter set picture order count, a picture parameter set picture order count cycle parameter and a picture parameter set temporal identifier picture order count parameter separately from buffer description information.

23. The electronic device of claim 14, wherein tracking the decoded reference picture is based on an information subindex and a picture order count parameter or a picture parameter set (PPS) picture order count parameter.

24. The electronic device of claim 14, wherein a subset of received pictures are referenced using delta referencing and a subset of received pictures are referenced using absolute referencing.

25. The electronic device of claim 14, wherein the POC cycle parameter is represented by one of the group consisting of a signed integer and an unsigned integer.

26. The electronic device of claim 14, wherein decoding the picture is based on one or more decoded reference pictures.

* * * * *